(12) United States Patent
Bitton et al.

(10) Patent No.: US 12,511,376 B2
(45) Date of Patent: Dec. 30, 2025

(54) METHOD, SYSTEM, AND TECHNIQUES FOR PREVENTING ANALOG DATA LOSS

(71) Applicant: Defy Photo Shield, LLC, Merrick, NY (US)

(72) Inventors: Tomer Bitton, Kibbutz Michmarot (IL); Jonathan Loew, Merrick, NY (US); Neil Shroff, Watchung, NJ (US); Mark Schlesinger, Bayville, NY (US); Daniel Goland, Palisades, CA (US)

(73) Assignee: Defy Photo Shield, LLC, Merrick, NY (US)

( * ) Notice: Subject to any disclaimer, the term of this patent is extended or adjusted under 35 U.S.C. 154(b) by 168 days.

(21) Appl. No.: 18/207,840

(22) Filed: Jun. 9, 2023

(65) Prior Publication Data

US 2024/0411865 A1 Dec. 12, 2024

(51) Int. Cl.
*G06F 21/55* (2013.01)
*G06F 21/16* (2013.01)

(52) U.S. Cl.
CPC ............ *G06F 21/552* (2013.01); *G06F 21/16* (2013.01)

(58) Field of Classification Search
CPC ............................. G06F 21/552; G06F 21/16
See application file for complete search history.

(56) References Cited

U.S. PATENT DOCUMENTS

| | | | | |
|---|---|---|---|---|
| 11,068,679 | B2 * | 7/2021 | Rodriguez | G06V 30/2247 |
| 11,106,919 | B1 * | 8/2021 | Balogh | G06F 9/4843 |
| 11,295,026 | B2 * | 4/2022 | Schondorf | G06F 21/316 |
| 2019/0340341 | A1 * | 11/2019 | Fleck | H04L 63/04 |
| 2020/0159937 | A1 * | 5/2020 | Schondorf | G06F 21/554 |
| 2021/0157998 | A1 * | 5/2021 | Rodriguez | G06V 20/20 |

(Continued)

OTHER PUBLICATIONS

Castillo, Dianne, "Transfer Learning for Machine Learning," Seldon Blog, Jun. 29, 2021, https://www.seldon.io/transfer-learning, 10 pages.

(Continued)

*Primary Examiner* — Linglan Edwards
*Assistant Examiner* — Kamryn J Gillespie
(74) *Attorney, Agent, or Firm* — Ellen M. Bierman; Lowe Graham Jones PLLC

(57) ABSTRACT

Methods, systems, and techniques for preventing and deterring unauthorized capture of analog data are provided. Example embodiments provide a Analog Data Loss Prevention System ("ADLPS"), which enables enterprise/company administrators to monitor access to analog data and to define and enforce customizable policies based upon defined risk profiles. The ADLPS platform is designed to identify violations of the "analog loophole" in organizations' data protection policies and to detect an accidental disclosure of confidential information, enabling enterprises to take appropriate steps for preventing data loss. In one example embodiment, the ADLPS comprises one or more ADLPS agents executing on each monitored endpoint device, one or more ADLPS agent backends, one or more ADLPS administrator user interfaces and backends, one or more databases, and one or more file storage devices/mechanisms. These components cooperate to detect security loopholes and enforce policies using advanced computer vision and machine learning models for object detection and recognition.

22 Claims, 15 Drawing Sheets

(56) References Cited

U.S. PATENT DOCUMENTS

| | | | |
|---|---|---|---|
| 2022/0057519 A1* | 2/2022 | Goldstein | G01S 17/88 |
| 2023/0092066 A1* | 3/2023 | Cella | H04W 4/70 |
| | | | 702/188 |
| 2024/0371510 A1* | 11/2024 | Aman | G16H 40/63 |

OTHER PUBLICATIONS

Wang, Chien-Yao, et al., "YOLOv7: Trainable bag-of-freebies sets new state-of-the-art for real-time object detectors," Institute of Information Science, Academia Sinica, Taiwan, Jul. 6, 2022, 15 pages.

Kundu, Rohit, "YOLO: Algorithm for Object Detection Explained [+Examples]," V7 Labs, Jan. 17, 2023, https://www.v7labs.com/blog/yolo-object-detection, 29 pages.

International Search Report and Written Opinion issued by the International Searching Authority in International Application No. PCT/US24/31575 on Aug. 30, 2024.

\* cited by examiner

Latest Events

| Risk | Event Name | Device Name | % | Action | Date |
|---|---|---|---|---|---|
| Medium | Unauthorized Camera Device | DESKTOP-YS98809A | 97% | User Notification | 14:50 24/01/2021 |
| High | Unauthorized Multiple People | DESKTOP-YS98809A | 84% | Block Screen | 20:12 22/01/2021 |
| Low | Unauthorized No Person | DESKTOP-YS98809A | 59% | Watermark | 16:50 24/01/2021 |
| Medium | Unauthorized Camera Device | DESKTOP-YS98809A | 97% | User Notification | 14:50 24/01/2021 |
| High | Unauthorized Multiple People | DESKTOP-YS98809A | 84% | Block Screen | 20:12 22/01/2021 |
| Low | Unauthorized No Person | DESKTOP-YS98809A | 59% | Watermark | 16:50 24/01/2021 |

METHOD, SYSTEM, AND TECHNIQUES FOR PREVENTING ANALOG DATA LOSS

TECHNICAL FIELD

The present disclosure relates to methods, techniques, and systems for preventing loss of data in analog form and, in particular, to methods, techniques, and systems for preventing data loss through analog loopholes and providing security by monitoring and enforcing data protection policies.

BACKGROUND

Cyber security related tools focus on intrusion attempts on endpoint devices, that is physical devices that connect to and exchange information with a computer network be they wired or wireless, e.g., computer systems, mobile phones, desktops, laptops, virtual machines, embedded devices, servers, and generally any IoT device, etc. For decades, security professionals have struggled with the gap between the endpoint device and the intended end-user. In essence, once information in a computer is translated to human-perceptible (analog) form, it is vulnerable to being captured whether through digital means or by human beings. No matter how much is invested in cyber security technology, which protects both data in transit and data at rest which is not being accessed (i.e. encryption, intrusion detection, etc.), that data will eventually need to be displayed on a screen visible to an end-user entitled to the information. The "analog loophole" (also referred to as the "analog hole," or "analog gap") describes a loophole in security that occurs at this point. The data displayed on the screen is susceptible to third party analog techniques of accessing and extracting the information. Some examples of such analog techniques include taking an image of this screen on a separate camera/phone device, allowing non-entitled users to look at the screen, or copying down the information separately, or by capturing it through other digital means.

The problem is exacerbated in many current enterprise work environments in which hybrid and remote working conditions abound. Workers for these enterprises often work remotely, often without visual oversight. Enterprises are currently tasked with demonstrating that they have taken prudent measures to minimize/prevent analog data loss in such situations.

BRIEF DESCRIPTION OF THE DRAWINGS

FIGS. 2A-2I are example screen displays of an example administrator user interface from an example Analog Data Loss Prevention System.

DETAILED DESCRIPTION

Embodiments described herein provide enhanced computer- and network-based methods, techniques, and systems for plugging the "analog loophole" and/or deterring unauthorized capture of data when it is visibly displayed to an end-user. Example embodiments provide a Analog Data Loss Prevention System ("ADLPS"), which enables users such as enterprise/company administrators to monitor access to analog data and to define and enforce customizable policies based upon defined risk profiles. The ADLPS platform is designed to identify violations of the "analog loophole" in organizations' data protection policies and to detect an accidental disclosure of confidential information, enabling enterprises to take appropriate steps for preventing data loss through managed devices and managed monitors.

The ADLPS solves this problem by preventing users from intentionally or unintentionally disclosing confidential company information, and/or providing organizations with the mechanisms necessary to identify the source of leaks/loss of data. The ADLPS is designed to reduce and/or prevent data loss by either:

(a) stopping the data loss in its path;
 (b) providing deterrence mechanisms to stop the use of analog loopholes and encourage vigilance among workers; and/or
 (c) providing mechanisms to trace the source of data loss if it does indeed occur.

In overview, the ADLPS platform provides a software application/agent installed on an endpoint device (such as an end-user computer system) which leverages cameras installed in or connected to the endpoint device (i.e. webcams) and advanced artificial intelligence ("AI") algorithms and computer vision algorithms via machine learning models to identify specific events occurring within view of the camera and to take a prescribed action in response to such detection. Examples of events in both the office and remote (work from home or offsite from the company) environment include users using cell phones, cameras, or other improvised photographic devices to capture an image or video of a managed display (e.g., a monitor), in addition to unauthorized human access in non-managed environments (e.g., a secondary person standing over a user's shoulder). Action responses are configurable and dependent on a specific set of circumstances and variables.

Figure 1:
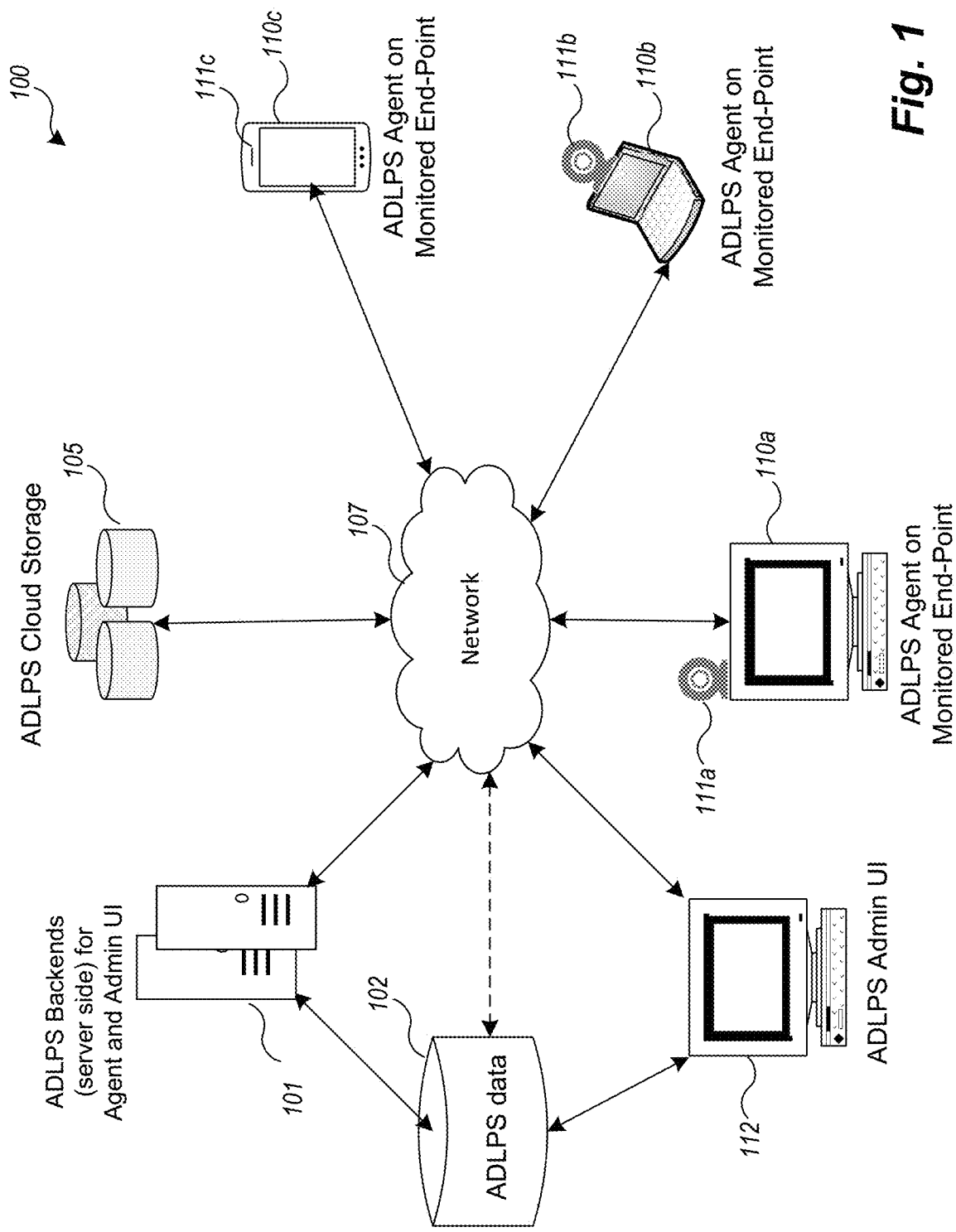
FIG. 1 is an example screen display of an example environment for executions of an example Analog Data Loss Prevention System platform.

FIG. 1 is an example screen display of an example environment for executions of an example Analog Data Loss Prevention System platform. In an example ADLPS platform 100, each end-user (endpoint) device such as computer 110a, laptop 110b, and smart phone 110c, is running an ADLPS agent (client side program logic (not shown) connected via a network 107 (such as a wide area or local area communications network) to an ADLPS backend (servers 101). The ADLPS agents 110 are responsible for "monitoring" the user endpoint devices, detecting security policy threats such as policy violations and/or event violations using trained machine learning models, and executing actions in response to such threats. Here "monitoring" refers to running software on the endpoint device so that unauthorized objects can be detected.

The ADLPS agents (e.g., software/hardware/firmware) executing on the endpoint devices 110a-110c are described below in further detail with respect to FIGS. 2A-2I and FIGS. 4-5. The agent (client) and backend (server) configuration of the ADLPS operates to define and enforce analog data loss prevention policies through the occurrence of events, determined based upon objects that are recognized, via cameras connected to or integrated within the end-user devices 110*a-c* as described in further detail below. For example, computer 110*a* has a webcam 111*a* which, when the ADLPS agent is active, detects and characterizes the presence of certain objects (e.g., cameras, persons, faces, lenses, etc.), determines which events have occurred based upon a likelihood that a particular object or combination of objects is recognized, stores event data (such as camera images), executes configured actions to occur based upon these determined events, and reports the information back to the ADLPS backend (server) 101 for reporting, logging, and/or analysis purposes. In other configurations, the machine learning used for recognition and the endpoint event determinations may be performed on the ADLPS backend which then cause the corresponding endpoint ADLPS agent to execute a corresponding action. Having the intelligence and logic reside in the ADLPS agent (client side) on the endpoint device may result in performance gains.

Rules defining which events dictate which actions/behavior are defined according to severity of risk (or a range of risk) by scenarios, termed "playbooks." In a typical ADLPS embodiment, the playbooks and correspondence between events and actions are configurable by an ADLPS administrator interface. One or more ADLPS administrator user interfaces 112 are responsible for configuration of the ADLPS environment for a particular deployment including configuration of the rules that determine what actions to perform when security policy threats are detected. The ADLPS administrator user interfaces 112 may be implemented by any type of client program logic including, for example, via a web browser interface. In some environments the ADLPS backend(s) for the ADLPS agents executes in separate computing systems from the ADLPS backend(s) that support the ADLPS administrator UI.

Similar to computer 110*a*, laptop 110*b* incorporates webcam 111*b* and smart phone 110*c* includes integrated camera 111*c* which are each used to monitor and recognize activity taking placed in visual range. In some ADLPS platforms, the image information used in event recognition is stored in ADLPS cloud storage 105. In addition, the ADLPS backend 101 may store logging data either locally in data repository 102 or in ADLPS cloud storage 105.

Figure 2A:
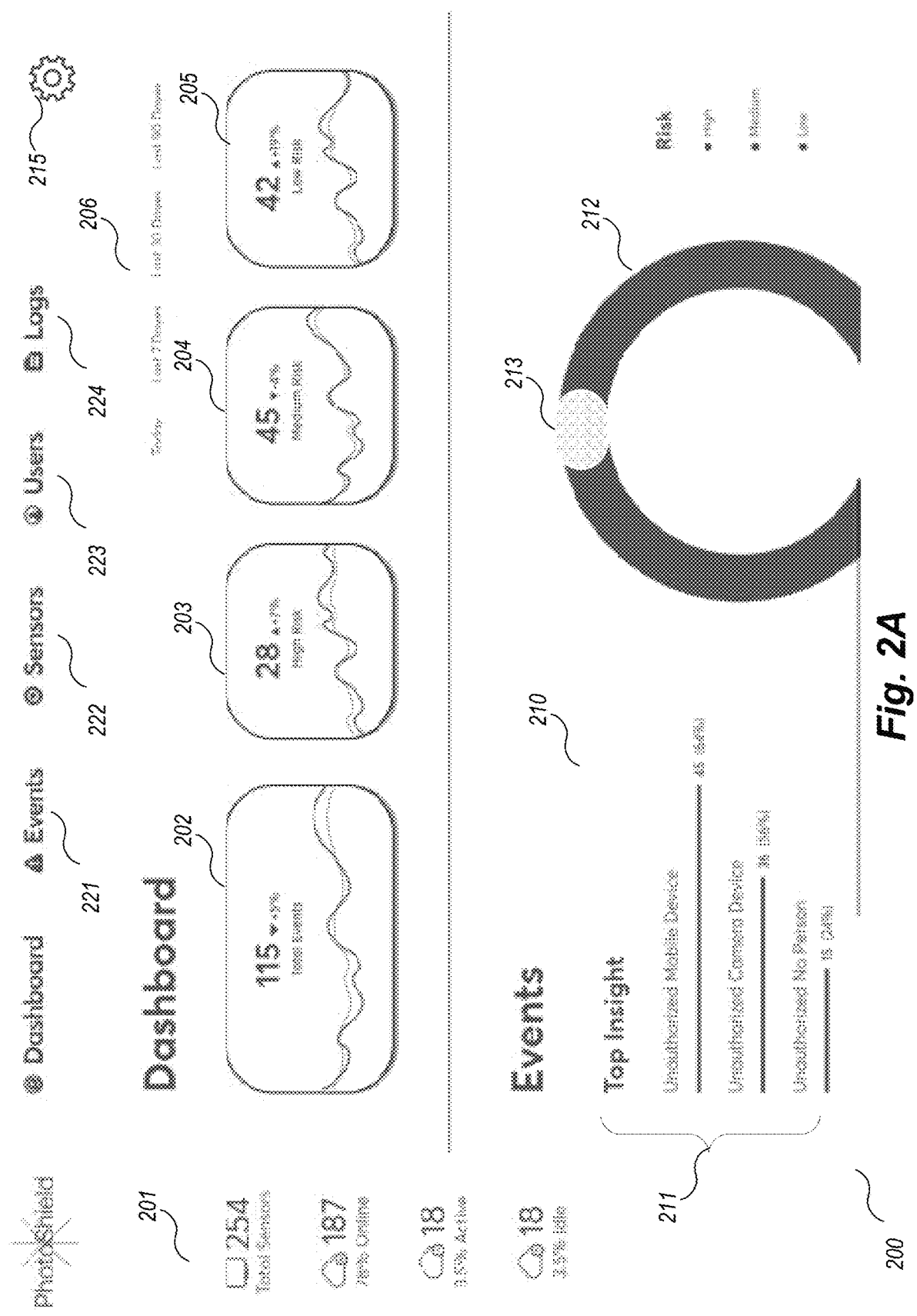

FIGS. 2A-2I are example screen displays of an example administrator user interface from an example Analog Data Loss Prevention System. FIG. 2A is an example screen display of an administrator dashboard used to configure and monitor an example ADLPS referred to as Photo Shield. Dashboard 200 currently illustrates several areas which are used to monitor and configure the ADLPS instance. For example, in the dashboard shown, sensor area 201 describes the endpoint devices (or potentially additional sensors on such devices) connected to the monitored environment (e.g., the enterprise, company, or individual endpoints that are connected to an ADLPS environment via an IP address). As shown, in this monitored environment there are 254 total sensors, 18 of which are active and 18 of which are idle, with 187 online. The dashboard 200 also shows the total number of events.

Dashboard 200 also includes an events area 210, which describes the top insights 211, namely the various events that have been recognized by the system such as an unauthorized mobile device or an unauthorized mobile camera. A visual representation of the percentage of risk 212 may also be shown. Area 213 represents the percentage of medium risk events (versus the rest of the visual which represents high risk events). As well, dashboard 200 examples that the breakdown of monitored events can be show in visuals 202-205, for example by percentage of those that are high risk (visual 203), medium risk (visual 204), and low risk (visual 205).

Dashboard 200 also includes various user interface ("UI") controls for accessing detail of different aspects of the ADLPS monitoring. For example, details on events can be accessed via the events UI control 221 and are described further with respect to FIGS. 2B-2D; details on sensors (end-user ADLPS agents) can be accessed via the sensor UI control 222 and are described further with respect to FIG. 2E; details on users can be accessed via the user UI control 223 and are described further with respect to FIG. 2F; details and access to recorded logs can be accessed via the user UI control 224 (not shown).

In addition, dashboard 200 allows an administrator to configure the monitoring environment (referred to as well as a "site configuration") including the establishment of playbooks which define the rules and behaviors for the actions taken by the ADLPS in response to events detected. Site settings and playbooks are described further with respect to FIGS. 2G-2I.

It is to be appreciated that different visuals, layouts and components of a dashboard can be used to represent different aspects and combinations of the events and risk determinations and that what is shown in dashboard 200 and the various UI controls provide one example of an ADLPS administrator interface. As well, different system configurations may monitor different events which will be reflected in a the various display screens, and different amounts of detail may be shown in the various displays. In addition, the ADLPS administrator interface may be enhanced by auditory and haptic feedback to further facilitate monitoring of events and actions and may be presented on other types of devices and endpoints other than from a web-based client.

As mentioned, an ADLPS platform 100 such as described with reference to FIGS. 1 and 2A operates by means of defined policies, events, actions, and playbooks. The following concepts are useful to understand the interplay of the components of example ADLPS environments.

Policies:

Policies are general guidelines and/or rules of behavior that are imposed by the ADLPS for enforcement to prevent analog data loss. In one example ADLPS referred to as Photo Shield, there are four "policies" that define the rules of behavior imposed by the system. These currently include:
 (A) Only authorized devices are allowed in the camera's field of view when active.
 (B) Only authorized users are allowed in the camera's field of view when active.
 (C) Camera violations are not allowed when active.
 (D) Camera must be available when active.

In other example ADLPS embodiments a different number of and/or different policies may be defined for enforcement. For example, in another Photo Shield example, only two policies which include (A) and (B) but not (C) and (D) are present.

Events:

Events are activities that are recognizable by the ADLPS agent (i.e., code logic) installed on an endpoint. Each policy defined in an ADLPS may correspond to different events that are determined and recognized by the ADLPS agent, for example using machine learning engines. (Note that in other example ADLPS implementations, the code logic for determination and recognition of events may be executed in the ADLPS server or even a different backend separate from the ADLPS server(s).)

In the Photo Shield example ADLPS (shown in FIG. 2A), policies and events are configured as follows:

Policy A: Only authorized objects are allowed in the camera's field of view when active.
    Event: Unauthorized Mobile Device. An unauthorized mobile device is in camera's field of view
    Event: Unauthorized Camera Device. An unauthorized camera device is in camera's field of view Policy B: Only authorized users are allowed in the camera's field of view when active.
    Event: Unauthorized Multiple People. Multiple people are detected in the camera's field of view, when only one at a time are authorized.
    Event: Unauthorized No Person. No people are detected in the camera's field of view, and/or unattended (no users) endpoint is not authorized.

Policy C: Camera violations are not allowed when active.
    Event: Unauthorized No Person. Unauthorized obstruction of the camera such that monitoring is not possible.

Policy D: Camera must be available when active.
    Event: No camera device available on endpoint to monitor for other Events.
    Event: Camera device on endpoint is not working/off.

The "no people" event may be used for a multiplicity of different events in some ADLPS examples. For example, an "Unauthorized No Person" event may be used when no target object (person, mobile, camera, human face, or lens) is detected which could be due to a camera obstruction or no person is detected. In other ADLPS examples, there may be separate events for each depending upon the detail and optimizations desired (e.g., having separate models may result in slower performance).

In other ADLPS embodiments, other types of events and other mappings of policies to events may be possible, for example, based upon the detection capabilities of the AI and computer vision algorithms and the desired outcomes. For example, in some ADLPS examples, camera flash can also be detected.

Actions:

Actions define the actual enforcement measures taken by the ADLPS in response to the detection and recognition of an event. Detection and recognition are based upon recognition by the AI and computer vision logic that a particular class of object (e.g., person, camera, mobile, human face, lens) has been seen. For example, if an event occurs, actions are mapped to automatically take place in order to accomplish one of the goals related to reducing analog data loss (e.g., stopping the data loss, deterring the data loss, or providing mechanisms to trace the source of the data loss). In one example ADLPS Photo Shield, the following actions may be defined and mapped to various events:

Block Screen (e.g., by displaying a full size image/window on the screen, turning a computer monitor/display off, or the like)—this action may be used to stop visibility of data and prevent data loss.

Display visible watermark (e.g., overlay of information such as user identification information on the screen)—this action may be used to deter the dissemination of data and allow the source of data loss to be identified.

Warning notification (e.g., a warning popup message or sound)—this action may be used to deter the activity that may create additional data loss risk In some ADLPS environments, the watermark may not be visible to a human but will appear on any image taken with a camera. In other example ADLPS environments, other actions may be defined to correspond to the same or other goals. For example, in some ADLPS environments it may be possible to cause a disconnect from VPN-which action may be used to instantly remove access to sensitive data.

Risk Score:

ADLPS embodiments define "risk scores" to events as a function of the machine learning and computer vision (AI) algorithms. A risk score is a probability that a particular event has been detected (i.e., that a particular object has been recognized) by the AI algorithms. Risk scores enable configuration administrators to associate different actions based upon the risk certain events represent to the company/enterprise. For example, the same event (e.g., detection of another person in camera view) in different scenarios, such as whether the computer is in the office or at a remote location, may represent different risks and thus result in different actions being enforced. In the Photo Shield example ADLPS, risk levels are defined as low, medium, and high, and the corresponding ranges are configurable by an administrator.

As a specific example, if the ADLPS is 70-100% certain (generating a risk score of 70-100) that an "unauthorized mobile device" has been detected, then regardless of the endpoint location, the ADLPS considers the risk "high" may want to block the screen. On the other hand, if the endpoint location is at the home (e.g., by detecting of use of VPN), then a risk score of 50-70 may be defined as medium risk, and the ADLPS may cause a corresponding action to display a watermark. In contrast, if the endpoint location is at the office (e.g., no use of VPN detected), then a risk score of 50-70 may be defined as low risk, and the ADLPS may cause a warning notification to be displayed. As well, the ADLPS may allow customization of what risk score ranges or amounts are associated with "high" "medium" and "low" risk by, for example, administrators or others with appropriate access rights.

Playbooks:

Playbooks are used to configure rules and associations such as in the example given above. Playbooks define a scenario based upon a profile, such as "in office" (e.g., using a known IP address of the office) versus remote (e.g., using VPN). Other profile examples may include whether the device is on or off, or whether the device is part of a specific cohort/department/group.

For each such profile, an action (e.g., display watermark, block screen, present warning, disconnect from a VPN, a web portal/website, or an IP address, turn off an application, discontinue use of some kind by a specific device unique identifier) can be associated with a detected event (e.g., unauthorized mobile device, unauthorized camera), based upon a risk assessment (e.g., low, medium, high) that each map to a range of risk scores. Each profile can represent a different combination of attributes. The following examples can be used to implement different enforcement scenarios:

1. Device on, no VPN connection, no corporate network access—this could mean enforcement is OFF and the endpoint device is being used on personal time and thus no enforcement is needed.

2. Device on, corporate VPN connection, corporate network access—this could imply a need for the strictest enforcement settings since endpoint device is connected to a corporate VPN.

3. Device on, no VPN connection, corporate network accessible—this could imply a need for enforcement settings practical for office use where VPN not relevant since the endpoint device is directly on the office network.

In some scenarios, where it is further possible to detect where the device is being used (such as using GPS information, IP addresses, or other information), it may be possible to determine that the device is being used from recognized location (such as a known or identifiable address of the user of the device) versus an unrecognized location. This type of differentiation may allow, for example, specification of different enforcement settings for a recognized location versus an unrecognized location. For example, the following example profiles may be used to implement different enforcement scenarios:

1. Device on, no VPN connection, no corporate network access—this could mean enforcement is OFF and the endpoint device is being used on personal time and thus no enforcement is needed.

2. Device on, corporate VPN connection, device at unrecognized location—this could imply a need for the strictest enforcement settings since endpoint device is connected to a corporate VPN from an unrecognized location.

3. Device on, corporate VPN connection, device at recognized (e.g., home) location—this could imply a need for medium enforcement settings as home use may entail less risk than public use.

4. Device on, no VPN connection, corporate network accessible—this could imply a need for enforcement settings practical for office use where VPN not relevant since the endpoint device is directly on the office network.

Figure 2B:
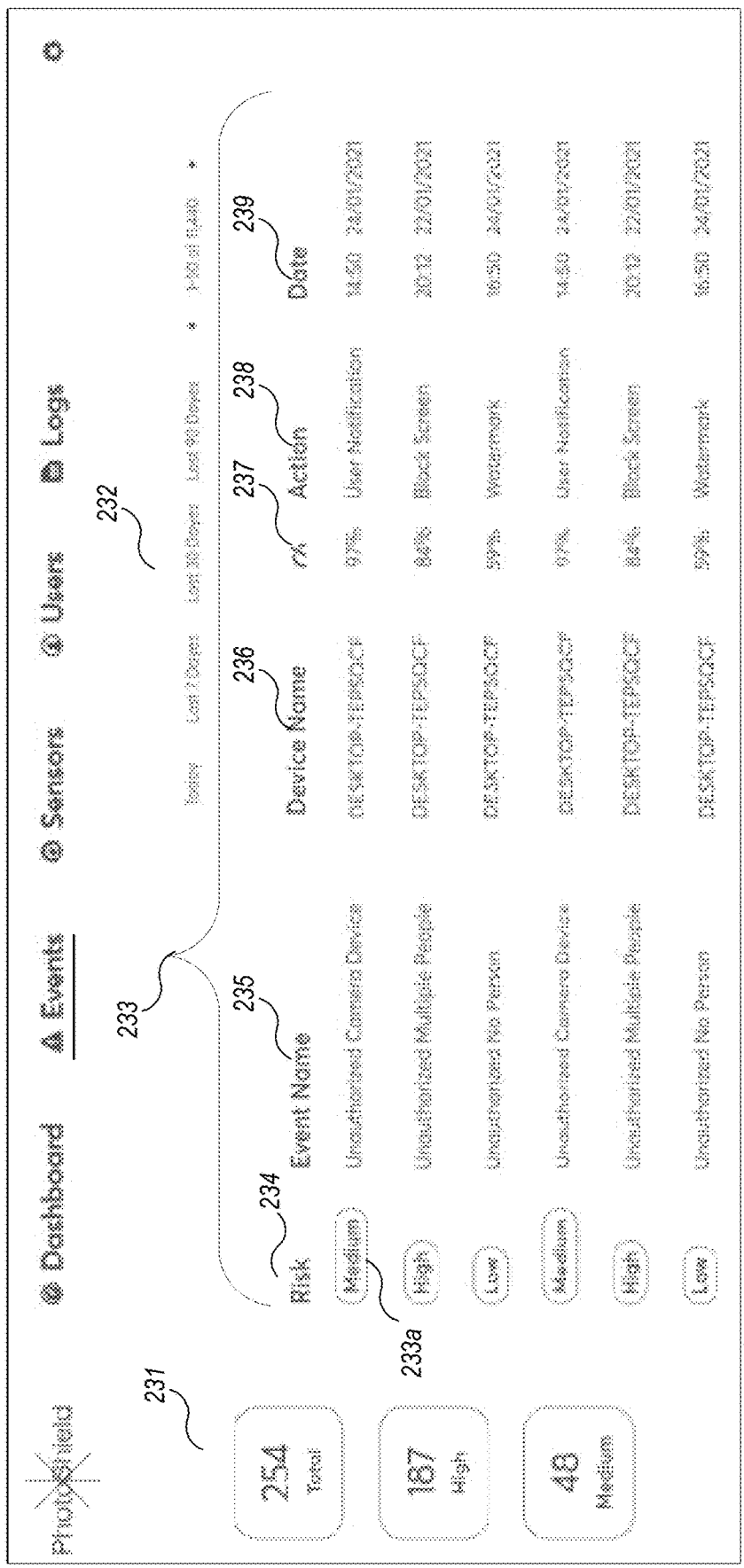
Figure 2C:

FIGS. 2A-2I illustrate many of these concepts and principles and demonstrate their interplay. Specifically, FIGS. 2B-2D are an example screen displays of an ADLPS administrator interface for viewing events in the Photo Shield example ADLPS. In FIG. 2B, screen display 230 shows a list of events 233 which can be filtered by controls 232 to show today, the last 7 days, last x days, etc. Example event list 233 is shown showing the details of each event, for example, event 233a. For each event, the ADLPS presents the event name 235 (i.e., the detected event), the device name (endpoint) 236 on which the event was detected, the date 239 the event occurred, an indication of the type of associated risk 234 (based upon the playbooks-configured scenarios), the risk score 237 determined by the AI and computer vision algorithms (representing the percentage confidence that the particular object that cause the event was recognized), and the action 238 taken in response, based upon the playbook, which includes rules for different profiles, and based upon rules in the system for determining actions when multiple perhaps conflicting actions are detected and recognized. A characterization of events detected 231 is also displayed.

In the example ADLPS, the events in event list 233 can be expanded for detail. FIG. 2C shows an example screen display when event 241 is expanded (e.g., by selection somewhere on the display of the line for event 241). Display area 242 shows the details of the action taken—that the screen was blocked, the policy the action corresponds to (e.g., "only authorized devices are allowed in the camera's field of view when active"), the class of the object recognized (e.g., "mobile"), the active profile (e.g., "Office") and other information. Here, the ADLPS captures a picture of the violation (e.g., from the camera frames) which can be logged for further analysis or review. When a new playbook is added, the administrator can configure this information (see FIG. 2I).

FIG. 2D is an example screen display of latest events 243. This display may be presented, for example, as part of the dashboard 202. These events are the most recent events detected and the information displayed for each such event is similar to that shown in event list 233.

Figure 2E:
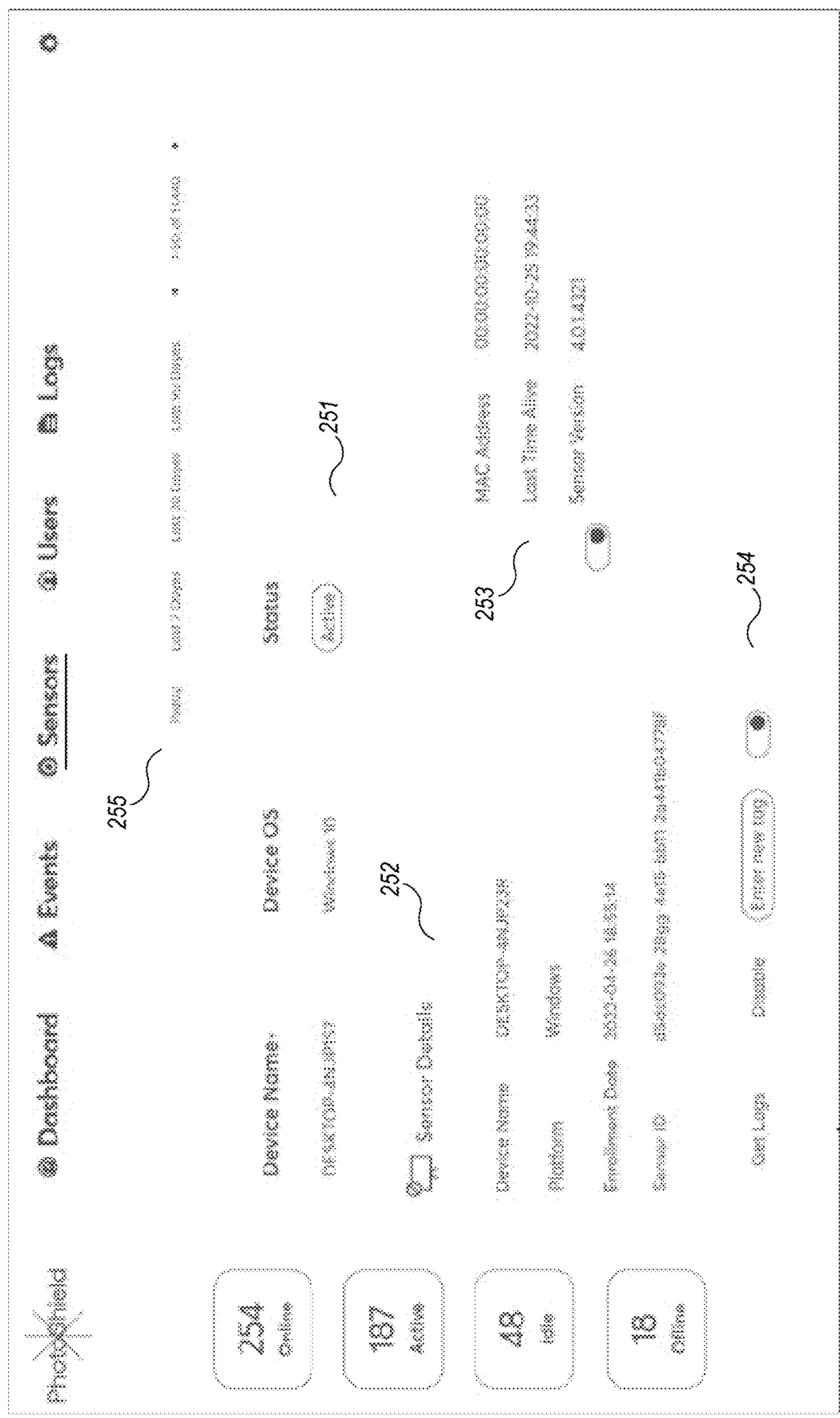

FIG. 2E is an example screen display of an ADLPS administrator interface for viewing sensors in the Photo Shield example ADLPS. Example display 250 illustrates a variety of details for the sensors (e.g., ADLPS agents) connected to the various endpoint devices. Display 250 shows details after selecting a particular sensor from a sensor list (not shown). Here, the sensor 251 is shown as active, and the details 252 pertaining to the devices, endpoint platform, sensor ids and versions, and location information is shown. As well, sensor controls 254 can be used to edit various aspects of the sensor including disabling it or inactivating it as appropriate. As well, the list of sensors can be filtered via UI control 255 similar to the events list. The last time the sensor was alive 253 is also monitored. The rate and frequency of how often the ADLPS agent obtains this information is configurable (e.g., 30 second heartbeat intervals).

Figure 2F:
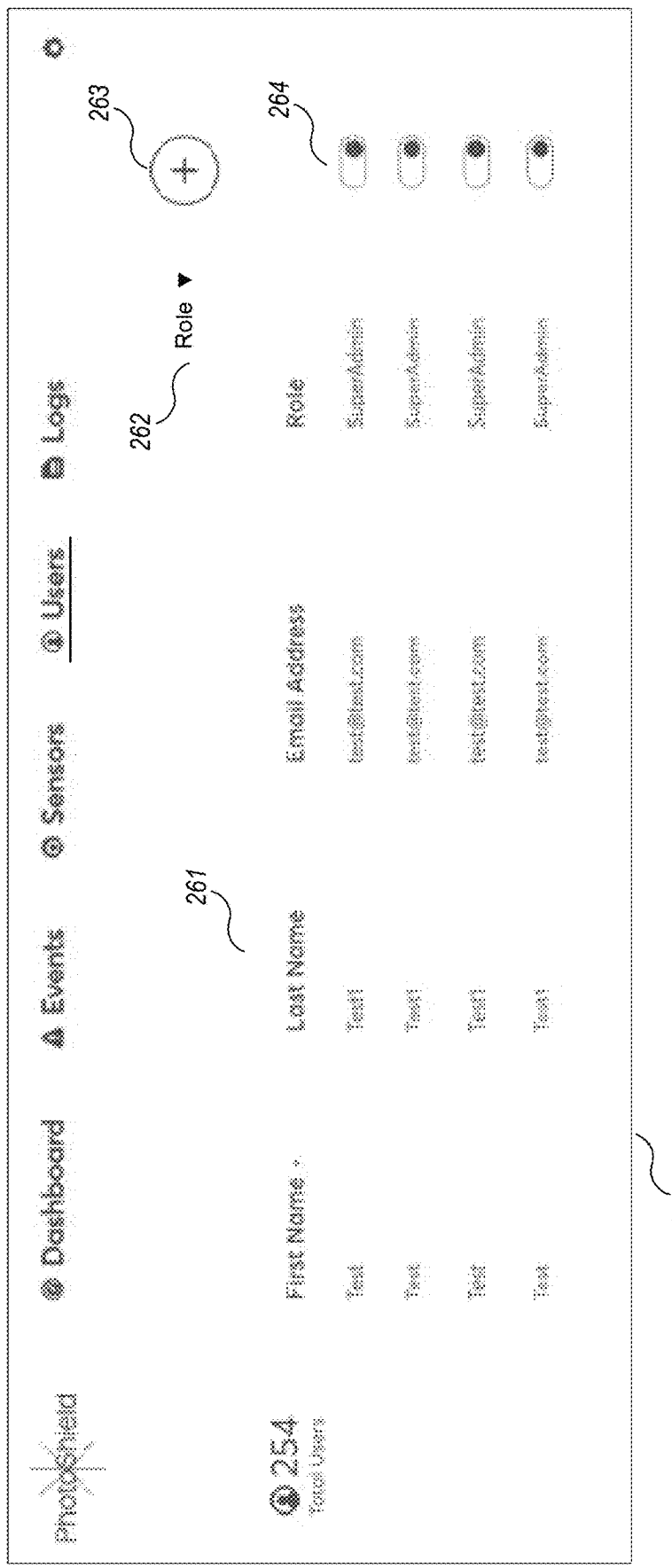

FIG. 2F is an example screen display of an ADLPS administrator interface for viewing and configuring users in the Photo Shield example ADLPS. Display area 260, for example, presents a list of users 261 configured in the current ADLPS configuration. They can be activated or inactivated by means of UI control 264 and they can be filtered by filter UI control 262. A new user can be added to the configuration through add UI control 263.

Figure 2G:
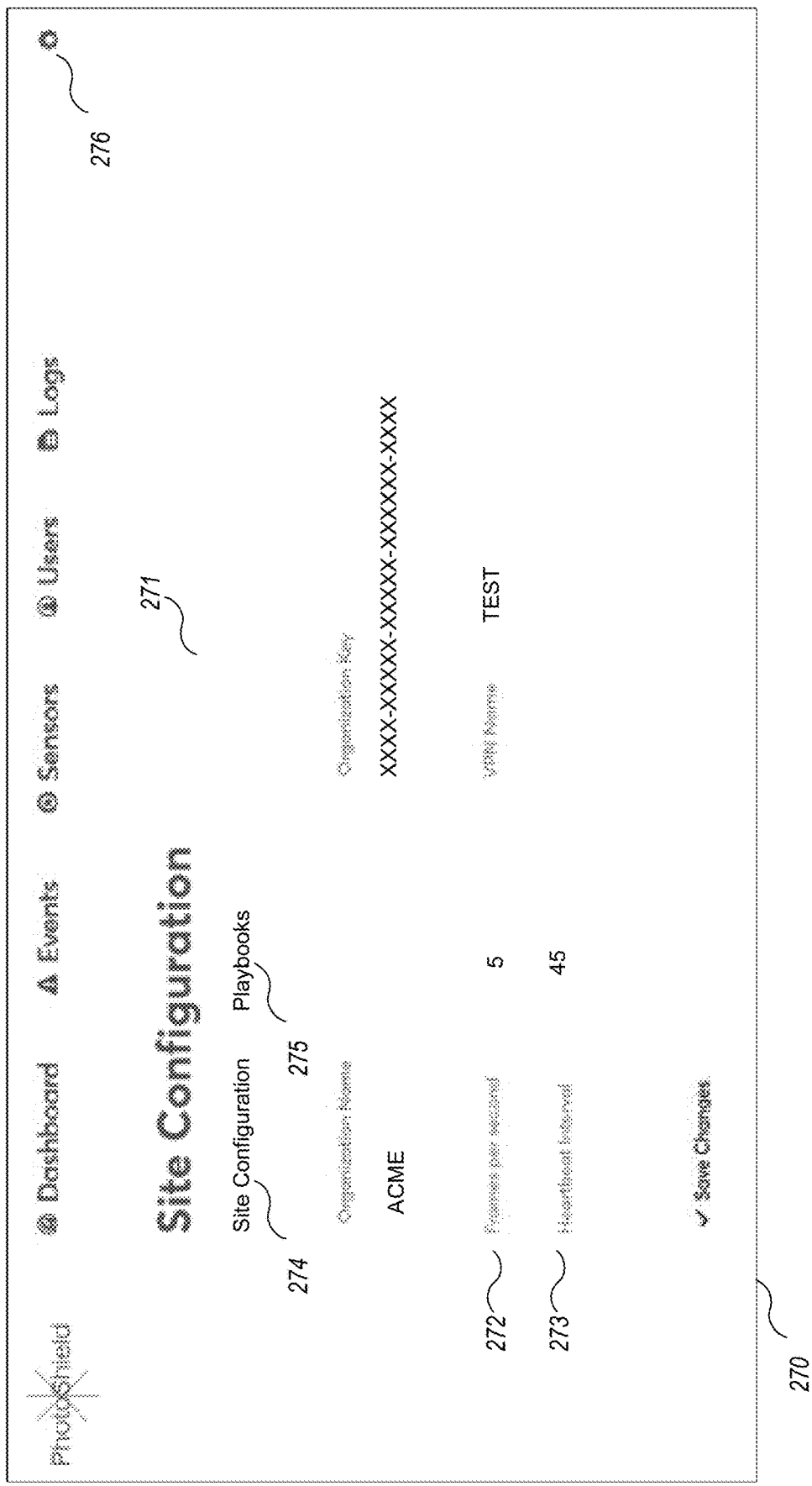

FIG. 2G is an example screen display of an administrator interface used to configure the site in the Photo Shield example ADLPS. This screen display may be accessed, for example, through settings UI control 276 (see also, control 215 in FIG. 2A). Display area 270, for example, allows the administrator to configure the parameters of the site (through UI control 274) or to configure the parameters of defined playbooks through UI control 275. Display 270 illustrates that for the current site "ACME", the ADLPS is detecting VPN use for VPN "TEST". The administrator can configure through UI control 272, the number of frames per second of data capture by the agents (through the cameras connected to each endpoint device) and through UI control 273, how often the endpoint device is checked for "live" ness status.

In some ADLPS environments, the number of frames per second (FPS) of data capture is automatically determined or optimized (e.g., by the agent itself or otherwise) based upon CPU/GPU usage and a rate limit/threshold. If the agent's CPU/GPU usage is below the limit/threshold, then the agent can use more frames per second. Once the limit/threshold is reached, the agent can decrease the frames per second to prevent overload of the endpoint device. In one example ADLPS, the FPS range is 1-8 frames per second of data. Other mechanisms and combinations for automated and/or specified use of frames per second of data can be similarly incorporated. For example, the UI can be used to indicate a rate limit/threshold or some combination or priority of administrator specified and automatic may be incorporated.

Figure 2H:
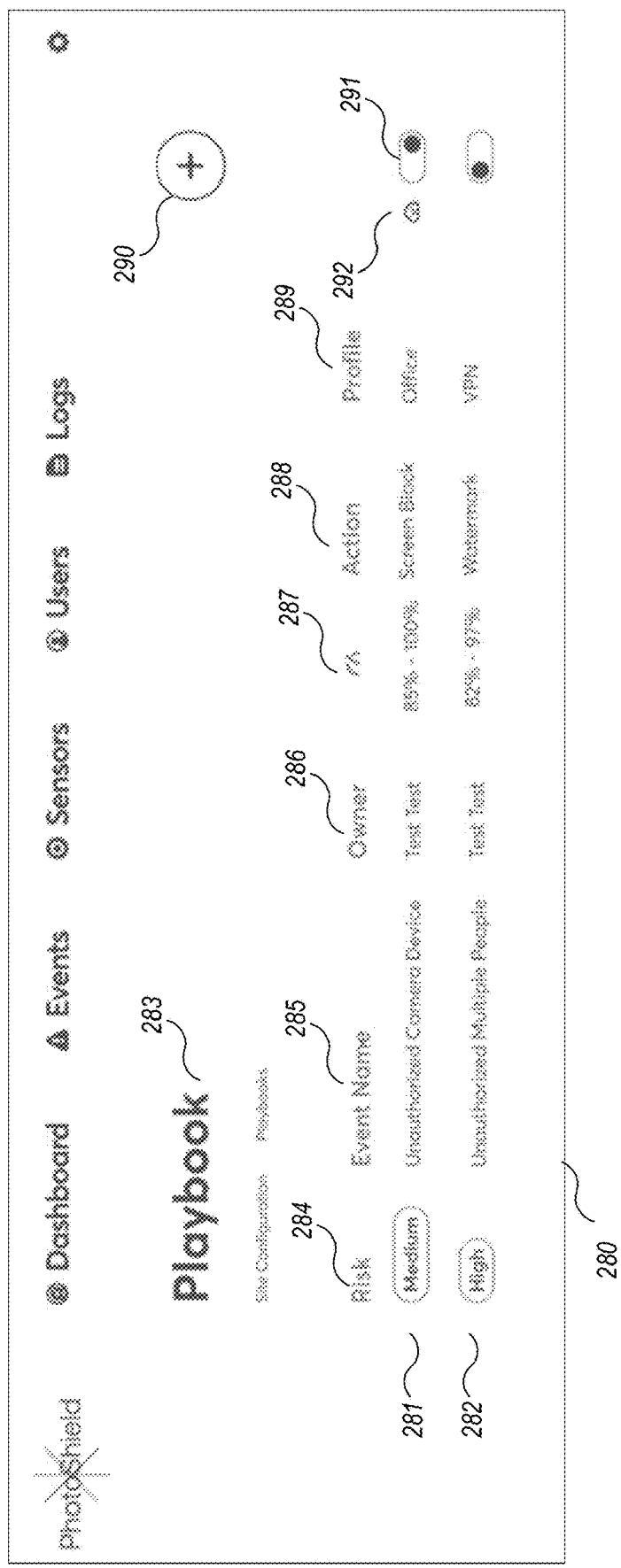

The parameters of currently defined playbooks and the ability to define new playbooks are accessed through UI control 275. FIG. 2H is an example screen display of an administrator interface used to review and configure playbooks in the Photo Shield example ADLPS. Display area 280 shows a list of currently defined playbooks 283. For each defined playbook, for example playbooks 281 and 282, the ADLPS presents an associated event name 285, who "owns" the playbook 286 (e.g., the creator, originator, or responsible individual), an assigned risk 284 (high, medium, and low), the risk score 287 associated with that risk (confidence require in the AI software that the event has occurred), the action 288 to be taken upon event recognition and an indication of to which profile 289 this playbook corresponds. For example, as explained above, the same event may pose different risks for an organization dependent upon whether the event is occurring "on site" or at a "remote public location" or at "remote at home." Each playbook can be activated or inactivated by means of UI control 291. In addition, each event displayed reflects whether the prediction images (used by the AI logic to determine the risk score) are stored (here configured to be stored in the storage). Other configurations for data storage and for what information is logged are similarly incorporated.

Figure 2I:
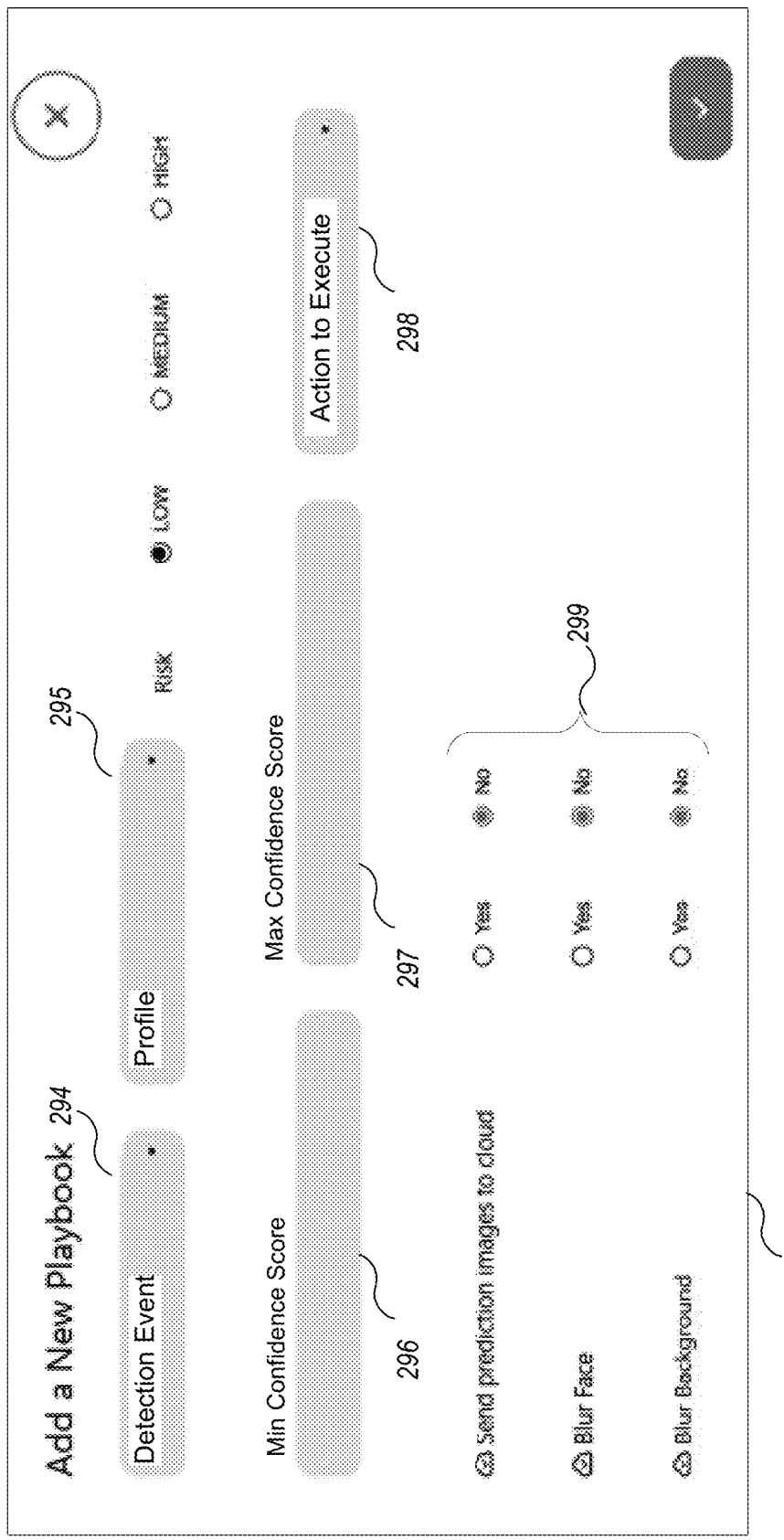

New playbooks are defined by selecting UI control 290 to add a new playbook. FIG. 2I is an example screen display of an administrator interface used to add a new playbook in the Photo Shield example ADLPS. As shown, display are 293 indicates several input fields for defining a new playbook. UI control 294 is used to set an event that this playbook corresponds to, namely in this example one of unauthorized mobile device, unauthorized camera device, unauthorized multiple people, unauthorized no person. UI control 295 is used to set a corresponding profile, namely OFFICE or VPN (e.g., remote) for this site configuration. UI controls 296 and 207 are used to set the associated risk range (minimum and maximum) that corresponds to a particular risk profile (here, low risk). UI control 298 is used to configure a corresponding action when this event is detected, for this profile, for this risk score (e.g., display watermark, block screen, present warning, disconnect from a VPN, a web portal/website, or an IP address, turn off an application, discontinue use of some kind by a specific device unique identifier). In addition, area 299 contains additional parameters that can be configured such as whether prediction images are stored, if so, whether the person's identity is obfuscated, and/or whether the background is blurred to further protect personal identification information as my be required in some locations or to abide by legal requirements.

Figure 3:
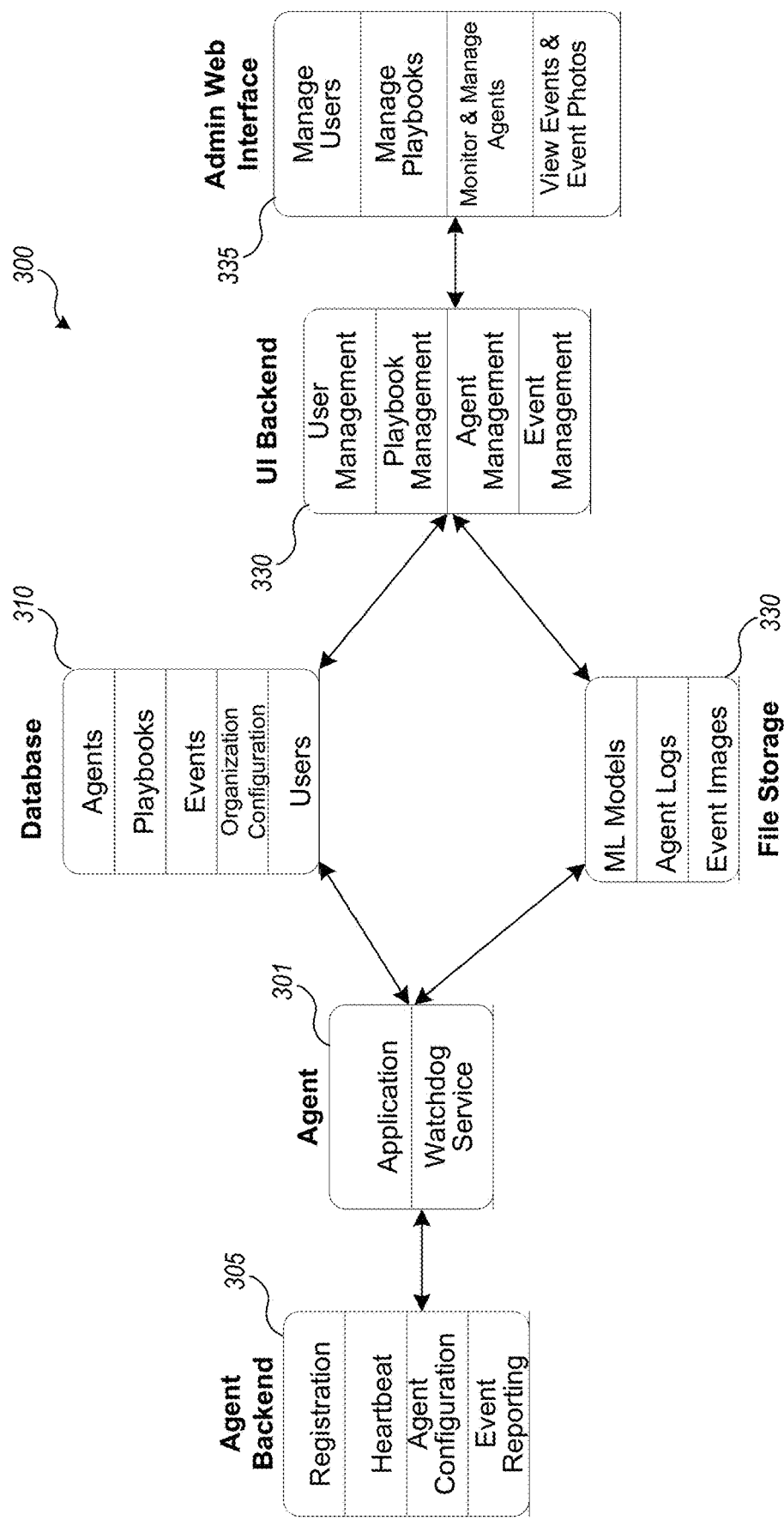
FIG. 3 is an example block diagram of example components of an Analog Data Loss Prevention System.

FIG. 3 is an example block diagram of example components of an Analog Data Loss Prevention System. In one example embodiment, the ADLPS comprises one or more functional components/modules that work together to implement data loss prevention and/or deterrence. For example, in the ADLPS platform 100 illustrated in FIG. 1, the ADLPS may comprise one or more ADLPS agents 301 executing on each monitored endpoint device, one or more ADLPS agent backends 305, one or more ADLPS administrator user interfaces 336, one or more administrator user interface backends 330, one or more databases 310, and one or more file storage devices/mechanisms 330. In some embodiments one or more of these components may be combined or may be absent and different capabilities assigned to the different components.

In an example ADLPS, such as Photo Shield, an ADLPS agent 301 executes on each monitored endpoint and is responsible for causing pictures to be taken using the endpoints' cameras or other capture devices, processing them using an advanced machine learning model for object recognition and to assess a risk score with each observed event, determine which action to cause to occur (e.g., block screen, display watermark, warn user, or disconnect resource, or the like) based upon the set of playbooks configured by an administrator via admin UI 335 and admin UI backend 330. The configured playbooks, event information, user information, and organization information are stored in one or more data repositories such as database 310, and are accessible to the agents 301 via a network (intranet, internet, wired, wireless, and the like).

The ADLPS agents 301 communicate (e.g., via duplex communication) with an ADLPS agent backend 305 to register an endpoint, perform heartbeat updates so the ADLPS knows that the endpoint is active/inactive, to report events, and to receive agent configuration information. The ADLPS agents 301 may also receive and access store machine learning ("ML") models and data from data repository (file storage) 330, which can be used to continuously train the models used for object recognition. ADLPS agents 301 may also store agent log data and event images in data repository 330

The ADLPS administrator UI 336, as described with respect to FIGS. 2A-2I is responsible for managing and configuring users and playbooks, monitoring and managing agents, monitoring and analyzing events and event phones, and the like. The administrator UI 336 communications with an ADLPS backend 330 to effectuate user management, playbook manage, agent management, and event management as described above. The administrator backend 330 may store data regarding the configured playbooks, event information, user information, and organization information in one or more data repositories such as database 310 and may also communicate with data repository 330 and access the ML models, agent logs, and event images.

As mentioned, the ADLPS agent, such as ADLPS agent 301 is responsible for monitoring endpoint devices (such as end-user devices 110*a-c* in FIG. 1), recognizing objects (via ML models) and detecting events that may pose security risks to displayed analog data, and enforcing rules, policies, and actions to prevent, inhibit, or deter data loss.

The techniques of analog data loss prevention and the Analog Data Loss Prevention System are generally applicable to any type of environment where analog data loss could occur. Although examples herein describe the detection of persons, camera (like SLRs), and mobile devices, as the intelligence of the ML models increase over time and additional computer vision algorithms are generated, the detection of more and different object classes may be enhanced. In addition, although current ADLPS example use certain types and classes of machine learning engines and computer vision algorithms, it is understood that other machine learning engines (that may not involve convolutional neural networks or recurrent neural networks) and other computer vision techniques may be incorporated yet still achieve the advantages and technical improvements presented here.

Also, although certain terms are used primarily herein, other terms could be used interchangeably to yield equivalent embodiments and examples. In addition, terms may have alternate spellings which may or may not be explicitly mentioned, and all such variations of terms are intended to be included.

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 4:
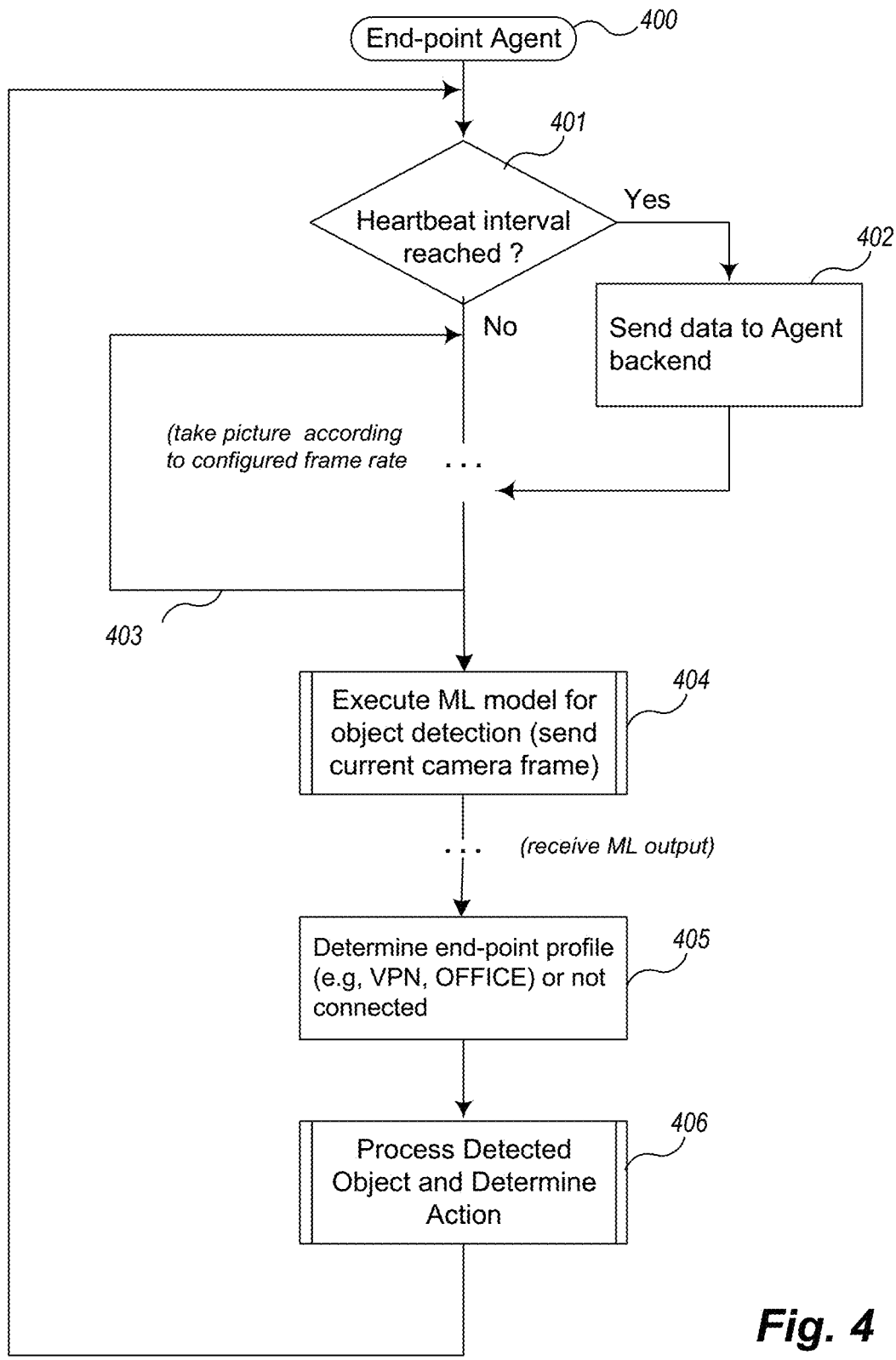
FIG. 4 is an example flow diagram of overview logic of an Analog Data Loss Prevention System Agent executing on an endpoint device.

FIG. 4 is an example flow diagram of overview logic of an Analog Data Loss Prevention System Agent executing on an endpoint device. As explained above, in some deployments it is preferable that the machine learning/object recognition and event processing be closest to the capture device for improved overall site performance. In other deployments and for other reasons (including security concerns), it may be preferable instead to locate the machine learning/object recognition logic external to the endpoint devices. Accordingly, the algorithms described with reference to FIGS. 4 and 5 can be correspondingly altered. Also, as mentioned previously, the ordering of the routines and any implication of sequential or concurrent processing can be modified as appropriate to the architectures upon which the ADLPS is deployed.

The example endpoint ADLPS agent logic 400 first determines in block 401 whether it is time to report its status to the ADLPS agent backend based upon a heartbeat interval. For example, FIG. 2G indicates that an administrator can set the heartbeat interval 273 via its UI. Other deployments may have decentralized heartbeat intervals. As explained in FIG. 3, if the end of the interval is reached then in block 402, the agent logic 400 sends appropriate data (such as "live" timestamps) to the backend. As well, in block 403, at a determined frames per second rate (see above as may be configurable by the admin UI by UI control 272 or automatic or some combination), the agent continuously causes the camera associated with the endpoint device to capture frames. Meanwhile, after each frame is captured, it is forwarded in logic block 404 to a configured machine learning model to perform object detection and recognition.

In one example ADLPS environment, the ADLPS agents utilize a machine learning architecture for computer vision known as YOLO v7 to detect and classify detected objects in a single pass of the image data. It uses a deep convolutional neural networks to achieve its performance and accuracy. More information on how YOLO v7 works to predict and classify objects in images can be found in "https://www.v7labs.com/blog/yolo-object-detection" and in Wang et al., "YOLOv7: Trainable bag-of-freebies sets new state-of-the-art for real-time object detectors," published as arXiv: 2207.02696, Cornell University, submitted Jul. 6, 2022, both of which are incorporated herein by reference in their entireties. The example ADLPS deployment uses transfer learning to take the relevant parts of the pre-trained YOLOv7 model and training it on specific datasets from online image databases and from ADLPS images to learn to classify for the object classes of interest and combinations of such objects. In addition, the ADLPS ML models feedback captured data to the ML model to improve the model over time. In some ADLPS environments, the ML model is also capable of detecting "flash" emanating from devices such as cameras or smartphones. As described herein, cameras generally refer herein to SLR, DSLR, and similar cameras, whereas mobile devices include cameras that are part of devices such as smart phones. It is understood that different distinctions could be made, and the algorithms described herein be equivalently modified and applied.

The currently incorporated ML model outputs tuples of (object, class, detection score) for each object recognized in the image. The detection score for an object is the percentage probability that the recognized object is what the ML model says it its. Thus, it is a type of "confidence" score.

In some ADLPS ML models, an obscured camera (e.g., a black photo) is not distinguished from a situation where no person is detected. These cases are both referred to as "Unauthorized No Person" when they are prohibited by a playbook. In other ADLPS ML models, these cases are distinguished by the ML model and more classes of objects recognized. The former architecture yields some performance gains and makes administration and implementation of the models more manageable.

Once the ML model returns its results, it is then the responsibility of the ADLPS agent in block 406 to determine, based upon the configured playbooks, which event has occurred (or is the most important) based upon the object recognized. Somewhere during the agent logic 400, the logic 400 determines (for example shown here in block 405, the endpoint profile that corresponds to the current state of the endpoint device-such as whether it is connected to VPN or connected from within the enterprise/company facility (here profile "OFFICE"). FIG. 4 shows this step as occurring right before calling logic to determine the relevant event and action so that it can determine updates such as detect a situation where the user is no longer using VPN or has moved from one remote network (such as in a coffee shop) to their home IP address.

In one ADLPS example, the agent determines which profile is applicable by querying a DNS server for a specified internal asset (to detect whether the profile should be "OFFICE") and/or by checking the Network Interface Adapters. Specifically if an adapter contains a designated target VPN vendor name with is OperationalStatus as "up" and its type as "NetworkInterfaceType.Ppp" or "NetworkInterfaceType. Tunnel" then the VPN is considered active.

In some ADLPS examples, the playbooks are configured for two different profiles: OFFICE, to cover the work in office use case, and VPN, to cover work from home or other remote locations use case. Other profiles can similarly be incorporated such as a profile that distinguished between working remotely at HOME versus OTHER location. This can be implemented by looking at the ip address or location of the endpoint if HOME ip addresses/locations are known a priori.

As mentioned, in block 406, the ADLPS logic 400 processes the detected object and determines which event occurred, and which action to perform. After initiating that task, the logic 400 returns to the beginning of the loop to block 401.

Figure 5:
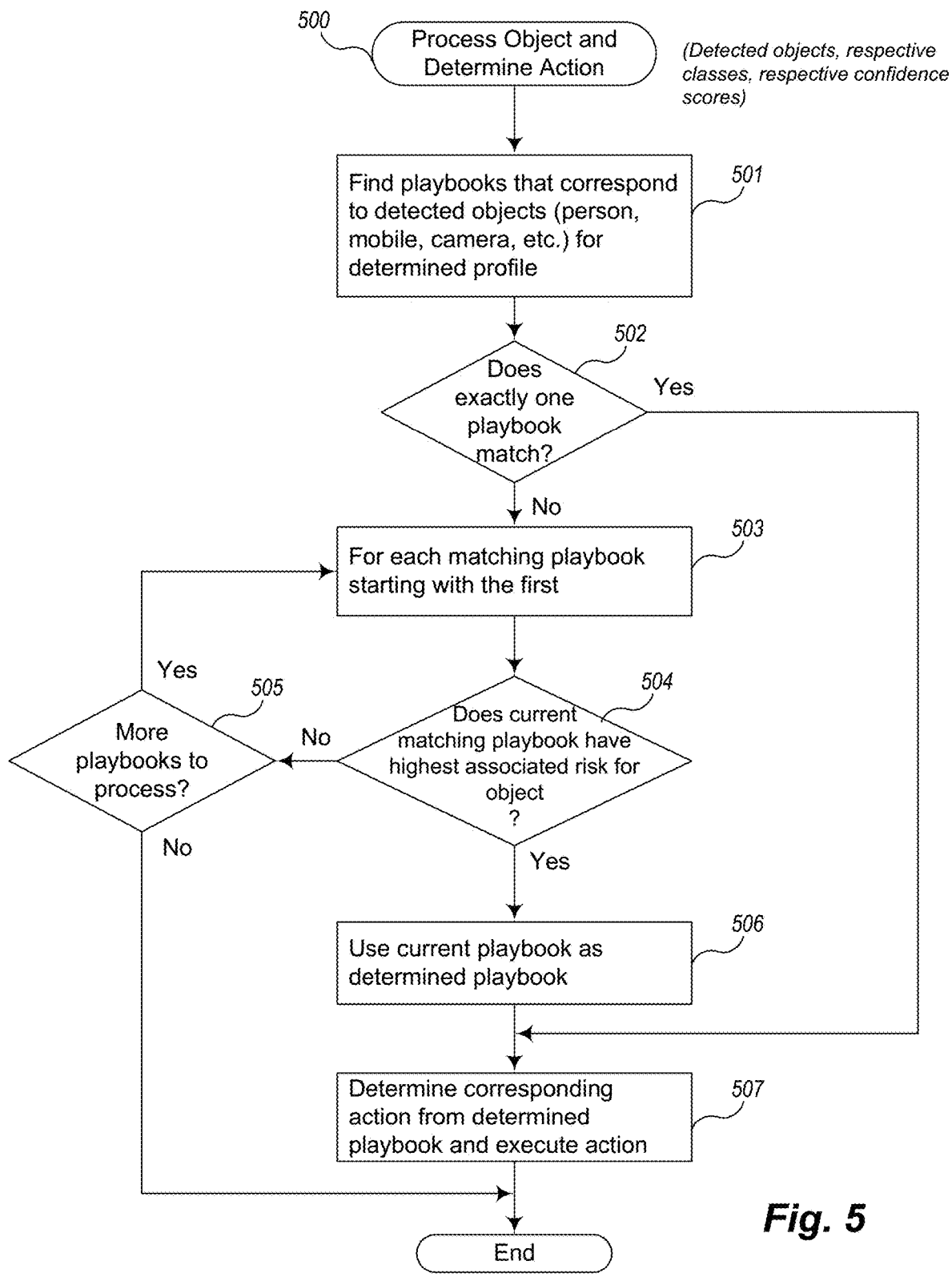
FIG. 5 is an example flow diagram of logic for executing actions based upon detected objects executed by an Analog Data Loss Prevention System Agent executing on an endpoint device.

FIG. 5 is an example flow diagram of logic for executing actions based upon detected objects executed by an Analog Data Loss Prevention System Agent executing on an endpoint device. Logic 500 begins by determining the playbooks that match the returned tuples from the ML model. In block 501 the logic finds all playbooks that correspond to detected objects for the endpoint profile determined in block 405 in FIG. 4. Specifically, the playbooks match if they are defined for the determined profile, for the detected object, and match the object detection score (the detected object score is within the minimum confidence score and maximum confidence score for the associated playbook).

In block 502, if exactly one playbook is matched (e.g., because there is only one object detected or only one of the detected objects is captured by a configured playbook), then the logic continues in block 507 to determine the corresponding action from the determined playbook and to execute the action. If not, the logic continues in block 503.

Blocks 503-505 comprise a logic loop to find the matching playbook that best matches the recognized objects when more than one object is detected in the camera's frame (field of view). For each such object, the logic 500 finds a matching playbook if one exists as described above-if they are defined for the determined profile, for the detected object, and match the object detection score (the detected object score is within the minimum confidence score and maximum confidence score for the associated playbook). The logic 500 executes the loop of blocks 503-505 until either there are no more playbooks to consider or the logic 500 has found the playbook that corresponds to the detected object with the higher severity level (block 504). (Not shown is the case where there are no playbooks that match any detected object(s)—in that instance the logic ends.)

Specifically, for each iteration, in block 504 if a matching playbook has the highest associated risk (detection level in the object tuple is within the confidence range of an associated low, medium, or high risk that is higher than for other playbooks that match detected objects), then the logic 500 continues in block 506 to use that playbook as the determined playbook, and proceeds to block 507 to determine the corresponding action from the determined playbook and to execute the action. If not, then in block 505, the logic 500 determines whether there are remaining playbooks to view, and if so continues to the beginning of the loop in block 503, otherwise the logic ends.

Although not shown in FIG. 5 to avoid complexity, in block 506, if two or more playbooks match the detected objects, then the logic 500 decides which playbook corresponds to the highest severity level (high, medium, or low) and executes the action associated with that playbook. Otherwise, if the severity levels of the matching playbooks are the same, the logic determines whether the actions are the same, and, if so, executes (enforces) the configured action. Otherwise, if the actions are different, the logic selects the playbook with the most severe action (e.g., block screen) to enforce.

Figure 6:
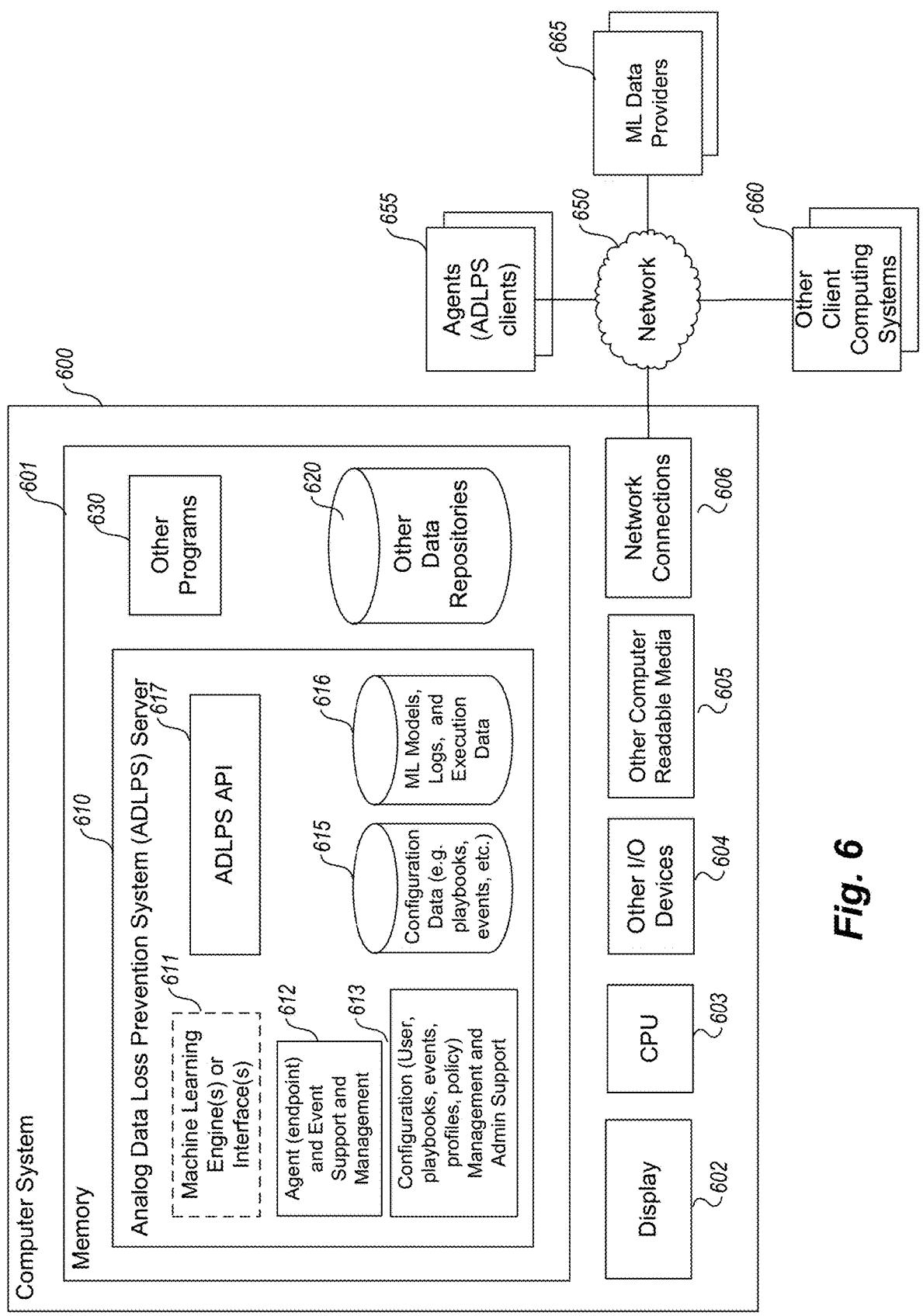
FIG. 6 is an example block diagram of an example computing system that may be used to practice embodiments of a Analog Data Loss Prevention System server logic described herein.

FIG. 6 is an example block diagram of an example computing system that may be used to practice embodiments of a Analog Data Loss Prevention System server logic described herein. Note that one or more general purpose virtual or physical computing systems suitably instructed or a special purpose computing system may be used to implement an ADLPS server. Further, the ADLPS server may be implemented in software, hardware, firmware, or in some combination to achieve the capabilities described herein.

Note that one or more general purpose or special purpose computing systems/devices may be used to implement the described techniques. However, just because it is possible to implement the ADLPS methods on a general purpose computing system does not mean that the techniques themselves or the operations required to implement the techniques are conventional or well known.

In addition, as described with reference to FIGS. 1 and 3, ADLPS servers are uses as backends for both endpoint ADLPS agents and for the ADLPS administrator UI. For ease, the server components illustrated in FIG. 6 provide both; however, it is understood that the two servers may be separate (or their functions distributed) or may be combined and/or may reside on the same or on different computing systems.

The computing system 600 may comprise one or more server computing systems and may span distributed locations. In addition, each block shown may represent one or more such blocks as appropriate to a specific embodiment or may be combined with other blocks. Moreover, the various blocks of the Analog Data Loss Prevention System Server 610 may physically reside on one or more machines, which use standard (e.g., TCP/IP) or proprietary interprocess communication mechanisms to communicate with each other.

In the embodiment shown, computer system 600 comprises a computer memory ("memory") 601, a display 602, one or more Central Processing Units ("CPU") 603, Input/Output devices 604 (e.g., keyboard, mouse, CRT or LCD display, etc.), other computer-readable media 605, and one or more network connections 606. The ADLPS server(s) 610 is shown residing in memory 601. In other embodiments, some portion of the contents, some of, or all of the components of the ADLPS server 610 may be stored on and/or transmitted over the other computer-readable media 605. The components of the ADLPS server 610 preferably execute on one or more CPUs 603 and manage the processing of ADLPS configuration and management of agents and administer user interfaces as described herein. Other code or programs 630 and potentially other data repositories, such as data repository 606, also reside in the memory 601, and preferably execute on one or more CPUs 603. Of note, one or more of the components in FIG. 6 may not be present in any specific implementation. For example, some embodiments embedded in other software may not provide means for user input or display.

In a typical embodiment, the ADLPS server 610 includes one or more machine learning models or interfaces 611 (if not implemented in the ADLPS agents), one or more agent and event support and managements 612, and one or more configuration (users, playbooks, events, profiles, policies) management and administrator support 613. As well, the ADLPS server 610 stores configuration data in one or more data repositories 616 and the ML models, logs, and execution data in data repository 616. In at least some embodiments, the machine learning engines or interfaces 611 are provided external to the ADLPS and is available, potentially, over one or more networks 650. Other and/or different modules may be implemented. In addition, the ADLPS may interact via a network 650 with ADLPS agent (application) code 655 as described earlier, one or more client computing systems 660 (e.g. that use results computed by the ADLPS server 610), and/or one or more third-party information provider systems 665, such as providers of image training data for use with the ADLPS ML models. Also, of note, the ML models, logs, and execution data data repository 616 may be provided external to the ADLPS as well, for example in a database accessible over one or more networks 650.

In an example embodiment, components/modules of the ADLPS server 610 are implemented using standard programming techniques. For example, the ADLPS server 610 may be implemented as a "native" executable running on the CPU 103, along with one or more static or dynamic libraries. In other embodiments, the ADLPS server 610 may be implemented as instructions processed by a virtual machine. In general, a range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the ADLPS server 610 (e.g., in the data repositories 615 and 616) can be available by standard mechanisms such as through C, C++, C#, and Java APIs; libraries for accessing files, databases, or other data repositories; through scripting languages such as XML, Python, etc.; or through Web servers, FTP servers, or other types of servers providing access to stored data. The data repositories 615 and 616 may be implemented as one or more database systems, file systems, or any other technique for storing such information, or any combination of the above, including implementations using distributed computing techniques.

Also the example ADLPS server 610 may be implemented in a distributed environment comprising multiple, even heterogeneous, computer systems and networks. Different configurations and locations of programs and data are contemplated for use with techniques of described herein. In addition, the [server and/or client] may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an ADLPS.

Furthermore, in some embodiments, some or all of the components of the ADLPS server 610 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 7:
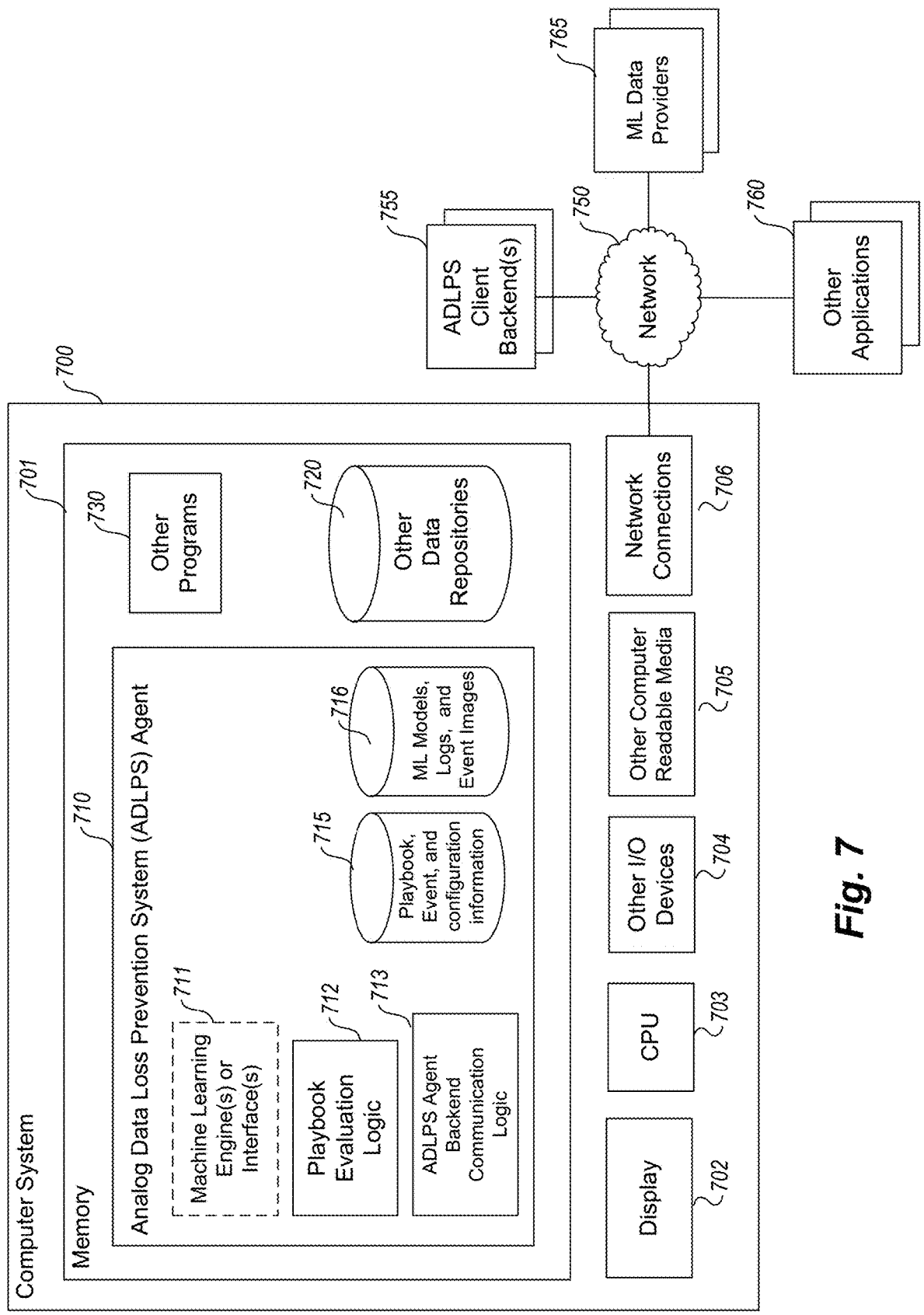
FIG. 7 is an example block diagram of an example computing system that may be used to practice embodiments of a Analog Data Loss Prevention System agent logic described herein.

FIG. 7 is an example block diagram of an example computing system that may be used to practice embodiments of a Analog Data Loss Prevention System agent logic described herein. Note that one or more general purpose virtual or physical computing systems suitably instructed or a special purpose computing system may be used to implement an ADLPS agent (client application) or to implement an ADLPS administrator UI (not shown). Further, the ADLPS agent May be implemented in software, hardware, firmware, or in some combination to achieve the capabilities described herein.

Note that one or more general purpose or special purpose computing systems/devices may be used to implement the described techniques. However, just because it is possible to implement the ADLPS methods on a general purpose computing system does not mean that the techniques themselves or the operations required to implement the techniques are conventional or well known.

The computing system 700 may comprise one or more client computing systems and may span distributed locations. In addition, each block shown may represent one or more such blocks as appropriate to a specific embodiment or may be combined with other blocks. Moreover, the various blocks of the Analog Data Loss Prevention System agent 710 may physically reside on one or more machines, which use standard (e.g., TCP/IP) or proprietary interprocess communication mechanisms to communicate with each other.

In addition, as described with reference to FIGS. 1 and 3, ADLPS agents execute on end-user endpoint devices and interface to ADLPS servers described with reference to FIG. 6. In a typical embodiment, the ADLPS client 710 includes one or more machine learning models or interfaces 711 (if not implemented in the ADLPS servers), playbook evaluation logic 712 (as described with reference to FIGS. 4 and 5), and communication logic 713 for communicating events, configuration, logs, images, etc. to ADLPS servers. As well, the ADLPS agent 710 may store playbook, event and configuration data in one or more data repositories 715 and the ML models, logs, and execution data in data repository 716. In at least some embodiments, the machine learning engines or interfaces 711 is provided external to the ADLPS agent and are available, potentially, over one or more networks 750. Other and/or different modules may be implemented. In addition, the ADLPS client may interact via a network 750 with ADLPS backend code 755 as described earlier, one or more other applications 760, and/or one or more third-party information provider systems 765, such as providers of image training data for use with the ADLPS ML models. Also, of note, the ML models, logs, and execution data data repository 716 may be provided external to the ADLPS as well, for example in a database accessible over one or more networks 750.

The components of the computing system 700 are configured and operate similarly and can be configured with alternative implementations similar to those described with reference to FIG. 6.

The ADLPS administrator interface can be implemented in a computing system similar to that shown for the ADLPS agent in FIG. 7.

From the foregoing it will be appreciated that, although specific embodiments have been described herein for purposes of illustration, various modifications may be made without deviating from the spirit and scope of the invention. For example, the methods and systems for performing prevention of analog data loss discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer implemented method for preventing loss of analog data displayed on a display screen of an endpoint device connected via a communications network to a server computing system, comprising:
   at a determined rate, causing a camera located proximate to the display screen of the endpoint device to capture an image frame of what is in front of the display screen;
   for each captured image frame, executing a machine learning model tailored to perform object recognition using computer vision algorithms for a predetermined set of object classes;
   for each of a plurality of captured image frames, receiving an indication from the executed machine learning model of one or more recognized objects, each recognized object associated with a one of the predetermined object classes and a confidence score indicative of probability of detection of the recognized object;
   determining a plurality of stored playbook configurations, each playbook configuration defining a device profile indicative of location of the endpoint device, wherein at least one of the playbook configurations is associated with use of the endpoint device using VPN access and a connection to the target computing system and wherein at least another one of the playbook configurations is associated with use of the endpoint device without VPN access and with a connection to the target computing system, wherein the stored playbook configurations are candidate configurations for matching to one or more objects, each candidate configuration defining a security risk scenario associated with an unauthorized event that corresponds to a target predetermined object class and an enforcement action, the security risk scenario having an associated range of probabilities of detection of the associated unauthorized event and defining an associated security risk level for the device profile of the candidate configuration, and wherein the unauthorized events that correspond to the predetermined object classes comprise an unauthorized mobile device, an unauthorized camera device, unauthorized multiple persons, or unauthorized no person;
   for each indication from the executed machine learning model of one or more recognized objects in a captured image frame, analyzing the determined candidate configurations to select a one matching candidate configuration with a highest risk level by:
   choosing potential candidate configurations with corresponding security risk scenarios that match a current state of VPN connection and network connection of the endpoint device, that match an unauthorized event that corresponds to the one or more recognized objects, and having an associated range of probabilities of detection of the associated unauthorized event that include the confidence score associated with the one or more recognized objects; and
   selecting from the potential candidate configurations the one matching candidate configuration with an associated highest risk level; and
   causing the enforcement action associated with the selected candidate configuration to be performed, wherein the enforcement action limits further visibility of the analog data displayed on the display screen and thus limits data loss or presents a warning notification to deter data loss.

2. The method of claim 1 wherein the causing the enforcement action associated with the selected candidate configuration to be performed causes blocking of the display screen by automatically turning off the display screen.

3. The method of claim 1 wherein the causing the enforcement action associated with the selected candidate configuration to be performed causes automatic displaying of a visible watermark that overlays the data displayed on the display screen with obfuscating or user identification information.

4. The method of claim 1 wherein the choosing potential candidate configurations with corresponding security risk scenarios that match a current state of VPN connection and network connection of the endpoint device, further comprises:
   determining a whether the endpoint device is currently connected with VPN access to the target computing system; and
   wherein, when the endpoint device is determined to be connected with VPN access to the target computing system, the causing the enforcement action associated with the selected candidate configuration to be performed causes the VPN access to the target computing system to be terminated or other blocking action to be performed.

5. The method of claim 1 wherein the causing the enforcement action associated with the selected candidate configuration to be performed causes presenting a warning notification augmented by audio.

6. The method of claim 1 wherein the causing the enforcement action associated with the selected candidate configuration to be performed causes an identifying watermark to appear.

7. The method of claim 6 wherein the identifying watermark will not appear to the human eye but will appear on any image taken with a camera.

8. The method of claim 1 wherein the analyzing the determined candidate configurations to select a one matching candidate configuration associated with a highest risk level, further comprises:
   determining whether the matching potential candidate configurations comprise a single matching candidate configuration;
   and, when determined that the matching candidate configurations comprise a single matching candidate configuration,
      determining from the single matching candidate configuration the associated enforcement action; and
      causing the enforcement action associated with the single matching candidate configuration to be performed.

9. The method of claim 1 wherein the choosing potential candidate configurations with corresponding security risk scenarios, further comprises:
   determining whether the potential candidate configurations comprise multiple candidate configurations that match a plurality of the indicated one or more recognized objects;
   determining whether the multiple matching candidate configurations are associated with a same level of risk; and
   when determined that the multiple matching candidate configurations are associated with the same level of risk, selecting a one of the multiple matching candidate configurations that is associated with a most severe enforcement action as the selected one matching candidate configuration.

10. The method of claim 1, wherein the determined rate is designated by a user interface control.

11. The method of claim 1 wherein the determined rate is in a range of 1-8 frames per second.

12. The method of claim 1 wherein the determined rate is automatically determined based upon CPU and GPU usage.

13. The method of claim 1 wherein the machine learning model is a convolutional neural network.

14. The method of claim 13 wherein the convolutional neural network performs a single pass on the captured image frame to recognize objects.

15. The method of claim 1 wherein the predetermined object classes comprise at least a person, a camera, and a mobile device.

16. The method of claim 1 wherein the plurality of stored playbook configurations corresponding to different security risk scenarios comprise: a) endpoint device on, no VPN connection to a designated target IP address and b) endpoint device on, VPN connection to a designated target IP address is active.

17. The method of claim 1 wherein the plurality of stored playbook configurations corresponding to different security risk scenarios comprise determination of whether the endpoint device is at a known or unknown location when a VPN connection to a designated target IP address is active.

18. The method of claim 1 wherein the unauthorized no person event corresponds to no detection of a person or corresponds to a camera obstruction.

19. A non-transitory computer-readable storage medium comprising instructions for controlling a computer processor, when executed, to prevent loss of analog data displayed on a display screen of an endpoint device connected via a communications network to a server computing system, by performing a method comprising:

at a determined rate, causing a camera communicatively connected to the display screen of the endpoint device to capture an image frame of what is in front of the display screen;

for each captured image frame, executing a machine learning model tailored to perform object recognition using computer vision algorithms for a predetermined set of object classes;

for each of a plurality of captured image frames, receiving an indication from the executed machine learning model of one or more recognized objects, each recognized object associated with a one of the predetermined object classes and a confidence score indicative of probability of detection of the recognized object;

determining a plurality of stored playbook configurations, each playbook configuration defining a device profile indicative of location of the endpoint device, wherein at least one of the playbook configurations is associated with use of the endpoint device using VPN access and a connection to the target computing system and wherein at least another one of the playbook configurations is associated with use of the endpoint device without VPN access and with a connection to the target computing system, wherein the stored playbook configurations are candidate configurations for matching to one or more objects, each candidate configuration defining a security risk scenario associated with an unauthorized event that corresponds to a target predetermined object class and an enforcement action, the security risk scenario having an associated range of probabilities of detection of the associated unauthorized event and defining an associated security risk level for the device profile of the candidate configuration, and wherein the unauthorized events that correspond to the predetermined object classes comprise an unauthorized mobile device, an unauthorized camera device, unauthorized multiple persons, or unauthorized no person;

for each indication from the executed machine learning model of one or more recognized objects in a captured image frame, analyzing the determined candidate configurations to select a one matching candidate configuration associated with a highest risk level that matches an unauthorized event that corresponds to the one or more recognized objects; and causing the enforcement action associated with the selected one candidate configuration to be performed, wherein the enforcement action limits further visibility of the analog data displayed on the display screen and thus limits data loss or presents a warning notification to deter data loss.

20. The computer-readable storage medium of claim 19 wherein the causing the enforcement action associated with the selected candidate configuration to be performed causes blocking of the display screen.

21. The computer-readable storage medium of claim 19 wherein the causing the enforcement action associated with the selected candidate configuration to be performed causes automatic displaying of a visible watermark that overlays the data displayed on the display screen with obfuscating or user identification information.

22. A computing system for monitoring loss of analog data to prevent loss of analog data displayed on a display screen of the computing system connected via a communications network to a server computing system, comprising:

a processor;
a memory;
one or more communicatively connected storage devices; and
code logic configured to, when executed on the processor:

at a determined rate, causing a camera communicatively connected to the display screen of the endpoint device to capture an image frame of what is in front of the display screen;

for each captured image frame, executing a machine learning model tailored to perform object recognition using computer vision algorithms for a predetermined set of object classes;

for each of a plurality of captured image frames, receiving an indication from the executed machine learning model of one or more recognized objects, each recognized object associated with a one of the predetermined object classes and a confidence score indicative of probability of detection of the recognized object;

determining a plurality of stored playbook configurations, each playbook configuration defining a device profile indicative of location of the endpoint device, wherein at least one of the playbook configurations is associated with use of the endpoint device using VPN access and a connection to the target computing system and wherein at least another one of the playbook configurations is associated with use of the endpoint device without VPN access and with a connection to the target computing system, wherein the stored playbook configurations are candidate configurations for matching to one or more objects, each candidate configuration defining a security risk scenario associated with an unauthorized event that corresponds to a target predetermined object class and an enforcement action, the security risk scenario having an associated range of probabilities of detection of the associated unauthorized event and defining an associated security risk level for the device profile of the candidate configuration, and wherein the unauthorized events that correspond to the predetermined object classes comprise an unauthorized mobile device, an unauthorized camera device, unauthorized multiple persons, or unauthorized no person;

for each indication from the executed machine learning model of one or more recognized objects in a captured image frame, analyzing the determined candidate configurations to select a one matching candidate configuration associated with a highest risk level that matches an unauthorized event that corresponds to the one or more recognized objects; and causing the enforcement action associated with the selected one candidate configuration to be performed, wherein the enforcement action limits further visibility of the analog data displayed on the display screen and thus limits data loss or presents a warning notification to deter data loss.

* * * * *